Nov. 1, 1938.   G. J. BELKNAP   2,135,298
BEER FAUCET
Filed Feb. 15, 1936

INVENTOR
George J. Belknap
BY
Wooster & Davis
ATTORNEYS

Patented Nov. 1, 1938

2,135,298

UNITED STATES PATENT OFFICE 2,135,298

BEER FAUCET

George J. Belknap, Bridgeport, Conn., assignor to The Belknap Manufacturing Company, Bridgeport, Conn., a corporation of Connecticut Application February 15, 1936, Serial No. 64,045

9 Claims. (Cl. 277—2)

This invention relates to new and useful improvements in faucets and has particular relation to beer faucets.

An object of the invention is to provide a faucet wherein on closing of the valve therein the spout thereof is immediately drained of all liquid so that there is no after drip and waste of the liquid being dispensed.

In these faucets there is considerable space in the discharge spout or portion under the valve seat, and when the valve is closed this as retained filled with the liquid, such as beer, by the atmospheric pressure, and then later gradually drips out after the glass which has just been filled is removed. This space may hold an ounce or more of liquid so that on drawing of each glass of beer for instance an ounce or more may be lost, which will obviously amount to a considerable loss in drawing many glasses. It is therefore an object of the invention to provide an opening which admits air to the upper part of this space in the spout as soon as the valve is closed after drawing a glass of beer and thus permit the liquid in the spout to immediately flow into the glass. Means is also provided operated by the valve handle to close this air opening just prior to the opening of the faucet valve and keep it closed while said valve is open, but to open the air inlet to drain the spout just as soon as the faucet valve is closed.

Other objects and advantages will become apparent from a consideration of the following detailed description taken in connection with the accompanying drawing wherein a satisfactory embodiment of the invention is shown. However it is to be understood that the invention is not limited to the details disclosed but includes all such variations and modifications as fall within the spirit of the invention and the scope of the appended claims.

Figure 1:
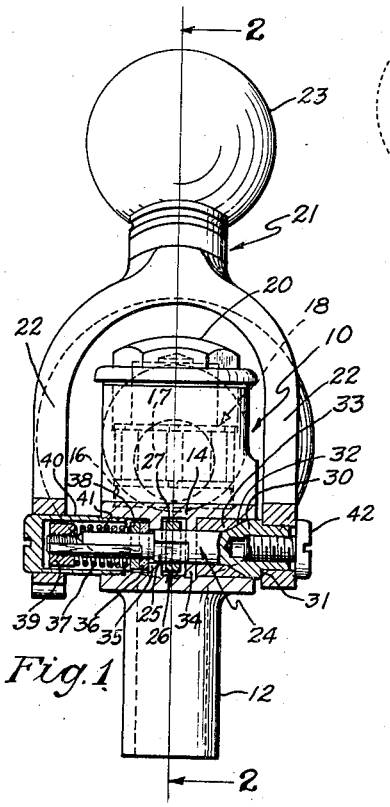
Fig. 1 is a view of the faucet of the invention, the view being taken substantially along the line 1—1 of Fig. 2.

Referring in detail to the drawing the faucet is shown as comprising a body 10 including a connecting portion 11 and a spout 12. The body portion 11 is adapted to be connected in any suitable manner, as through a nipple 13 or the like, with a suitable source of supply of the liquid to be dispensed, such for example as beer. Within the body at the upper end of the spout 11 there is a cross wall 14 having a passage or opening 15 therethrough, and disposed on the upper surface of this wall is a rubber or similar washer 16 comprising a seat for a ball valve 17 of bronze or other suitable material. The valve is located in a cage 18 and is normally held on its seat by a coil spring 19 bearing at one end against the valve and at its other end against a hollow nut or bonnet 20. This nut or bonnet is threaded into and closes the upper end of the faucet body after the valve parts have been placed therein and gives access for the replacement of such parts.

Figures 2, 3:
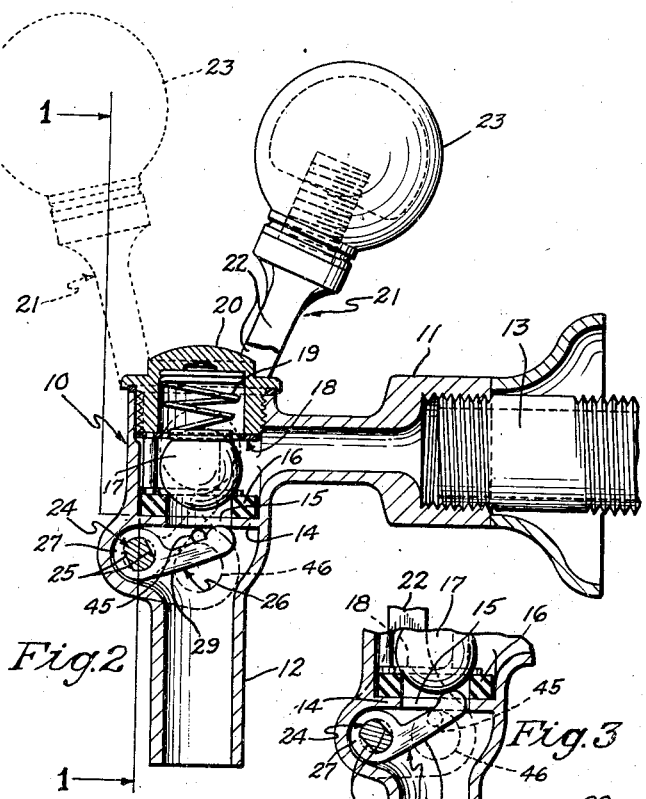
Fig. 2 is a view taken substantially along the line 2—2 of Fig. 1 and showing the valve closed.
Fig. 3 is a detail sectional view showing the parts positioned ready to begin opening of the valve.
Figures 8, 9:
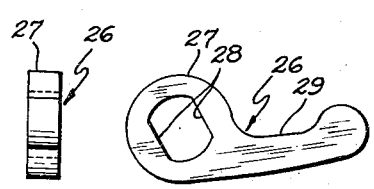
Figs. 8 and 9 are elevational views at right angles to one another and showing a valve unseating pawl.
Figure 7:
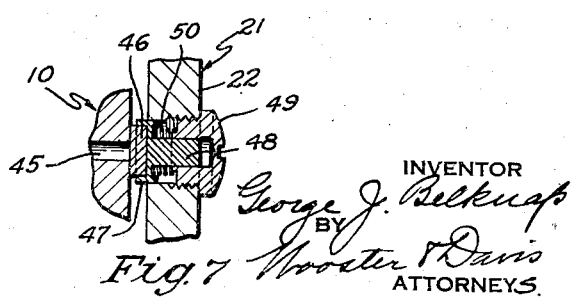
Fig. 7 is a detail sectional view showing a vent closing means.

The valve 17 is unseated by swinging of a handle 21 from the full line position to the dotted line position of Fig. 2. Such handle comprises a pair of connected arms 22 and a ball-like hand piece 23. A spindle 24 is actuated by the handle, which spindle extends through the valve body and for a short distance intermediate its ends has its opposite sides flattened at 25. A pawl 26 is mounted on this flattened portion of the spindle and is so located within the body that on turning of the spindle in one direction the pawl engages the valve 17 and unseats it. As shown best in Figs. 8 and 9 pawl 26 includes a perforated enlarged portion 27 which receives the flattened portion of spindle 24, and the perforation of which includes a pair of flat sides 28 cooperating with the flats 25 of the spindle so that the pawl turns with the spindle. Also the pawl includes an arm 29 the outer or free end of which may be brought against the valve 17 to unseat it.

At one end spindle 24 includes a head-like portion 30 having a tapped opening in its outer end and having its outer end portion reduced providing a shoulder 31. The inner surface of the head 30 is tapered as at 32 and such taper enters into the tapered portion of a soft metal bearing 33, such as babbitt or moulded "metalastic", the inner end of which abuts against a wall 34 comprising an integral part of the faucet body. Opposite and spaced from the wall 34 is a similar wall 35 through which the spindle also extends and a fiber washer 36 is held against the wall 35 by a coil spring 37 disposed about a portion of the spindle. As here shown a metal washer 38 is interposed between the spring 37 and the washer 36 and a nut 39 is threaded on the end of the spindle. The spring 37 is constantly bearing against the nut 39 tending to draw the spindle head 30 into the bearing 33 whereby the spindle is kept in a solid condition against any loose movements and making it liquid tight. The spring also presses fibre washer against wall 35 and keeps the opening therein leakproof.

A sleeve or hollow screw 40 encloses the nut 39 and the spring 37 and is threaded to the faucet body at 41. One arm of the handle has bearing on the sleeve 40 and it will be apparent that the spindle is turnable relative to this sleeve. The other arm 22 of the handle has a non-circular opening which receives the outer reduced non-circular end portion of the head of the spindle so the spindle is turned by the handle. The handle is secured to the spindle by being clamped between the shoulder 31 and the relatively large head of a screw 42 threaded into the head of the spindle. By reference to Fig. 1 it will be noted that the pawl 26 is mounted on that portion of the spindle located between the walls 34 and 35 of the faucet body.

From Fig. 2 it will be clear that in the opening and closing of the valve 17 the handle 21 is moved only a short distance. As one arm of the handle is secured to the spindle swinging movement of the handle results in turning movement of the spindle, and as the handle is swung from the full line position (Fig. 2) to the dotted line position the pawl 26 is swung to its dotted line position forcing the valve 17 upwardly of its seat. On the handle being swung back to normal position the pawl 26 is carried out of the way and the spring 19 together with gravity seats the valve. A laterally extending lug 43 rigid with the faucet body extends into an arcuate slot 44 in the inner surface of one of the handle arms 22 to positively limit swinging movement of the handle.

When the valve 17 is closed to cut off the flow of a liquid through the faucet a considerable amount of such liquid will be in the spout 12, and I provide means for venting the spout as soon as the valve is closed so that such liquid immediately flows out of the spout into a glass or other container being filled and does not gradually drip from the spout and become wasted. To this end a small vent opening 45 is drilled through a side wall of the faucet body 10 and enters the spout 12 in the upper portion thereof, preferably just below the valve seat wall 14. The outer end of this vent is closed by a disc or pad 46 of leather or other suitable material whenever the valve 17 is off its seat.

The pad 46 is carried by an inner head-like portion 47 of a plunger mounted in one of the handle arms 22 and including a stem portion 48 telescoping with a hollow screw 49 threaded into said handle arm. The end of the stem is preferably recessed to receive the pad 46. A coil spring 50 is disposed between the inner end of the screw 49 and the outer side of the plunger head 47 and constantly urges the plunger in the direction of the faucet body so that the pad 46 is kept against the side of said body.

Figure 4:
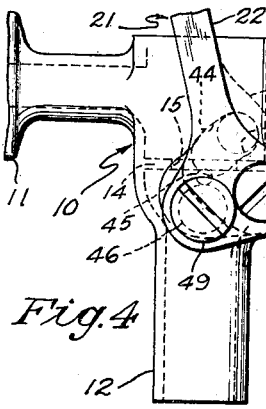
Fig. 4 is a detail elevational view showing the handle pad in the position occupied by it when the valve is closed.
Figure 5:
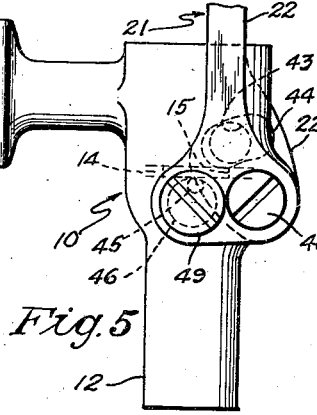
Fig. 5 is a similar view showing the position of the handle pad when the valve unseating pawl is in the position of Fig. 3.
Figure 6:
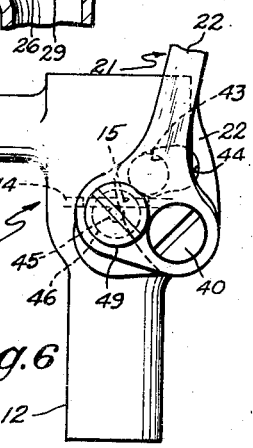
Fig. 6 is a view similar to Fig. 4 the handle being in the position occupied by it when the faucet valve is open.

Valve 17 is normally closed and the vent 45 is normally open. In Figs. 2 and 4 valve 17 is closed and the pad 46 is laterally of the vent 45. In Figs. 3 and 5 the handle 21 has been advanced sufficiently to carry the pad 46 over the vent 45 and to bring the pawl 26 against the valve 17 just ready to open it. In the dotted line position of Fig. 2 and in Fig. 6 the handle 21 is in its forward position the valve 17 is open and the pad 46 is closing the vent 45. Since the vent is closed just prior to the opening of the valve 17 the liquid being dispensed does not have an opportunity to squirt out through the vent. The reverse of the above operation is also true, and on return movement of the handle the disc 46 is shifted or carried away from the vent just as soon as the valve 17 seats. As the vent opens air is admitted to the upper portion of the spout 12 so that the liquid in the spout immediately drains therefrom.

Having thus set forth the nature of my invention, what I claim is:

1. In a faucet, a body including a connecting portion and a spout, a valve controlling the passage of liquid from said portion to said spout, a handle controlling the opening and closing of said valve, said body having a vent leading into the upper part of the spout portion thereof, and means movable to and from a position against the outer end of said vent for closing and opening the same as said valve is opened and closed.

2. In a faucet, a body including a spout, a normally closed valve controlling the passage of liquid through the body to the spout, said body having a normally open vent communicating with the inner portion of the spout, means to move said valve to open position, and means movable by said first means to a position against the outer end of said vent to close it prior to the opening of said valve.

3. In a faucet, a body including a spout, a valve seat, a valve, a spring normally maintaining said valve on its seat cutting off communication through the body to the spout, said body having a normally open vent leading into the same at the spout side of said valve seat, means operable to move said valve off its seat, and means movable by the first means to a position against one end of said vent to close it prior to the unseating of the valve.

4. In a faucet, a body including a spout, a valve seat, a valve, means normally maintaining said valve on its seat cutting off communication through the body to the spout, said body having a normally open vent entering the same at the spout side of the valve seat, a handle movable to unseat said valve, and means movable by said handle into a position across one end of and closing said vent as the handle is moved to open said valve.

5. In a faucet, a body including a spout, a valve seat, a valve, means normally maintaining said valve on its seat cutting off communication through the body to the spout, said body having a normally open vent leading into the same at the spout side of said valve seat, a spindle mounted in said body, a pawl on said spindle, a handle shiftable to turn said spindle to cause the pawl to engage and unseat the valve, and means moved by said handle into a position closing said vent as the handle is moved to unseat the valve.

6. In a faucet, a body including a spout, a valve seat, a valve, means normally maintaining said valve on its seat cutting off communication through the body to the spout, said body having a normally open vent entering the same at the spout side of the valve seat, a spindle mounted in said body, a pawl on said spindle, a handle shiftable to turn said spindle to cause the pawl to engage and unseat the valve, means moved by said handle into a position closing said vent as the handle is moved to unseat the valve, and said pawl and means so related that as the handle is moved to unseat the valve said means is moved into position closing the vent prior to the unseating of the valve by the pawl.

7. In a faucet, a body including a spout, a valve seat, a valve, means normally maintaining said valve on its seat cutting off communication through the body to the spout, a spindle mounted in the body, a pawl on the spindle, a handle secured to said spindle at the side of the body and operable to turn the spindle to cause the pawl to engage and unseat the valve, said body having a vent opening through a side wall thereof entering the spout at the outlet side of the valve seat, and a spring pressed means bearing against the side of the valve body and movable with the handle to and from a position closing said vent opening as the handle is moved to open and close the valve.

8. In a faucet, a body including a spout, a valve seat, a valve, means normally maintaining said valve on its seat cutting off communication through the body to the spout, a spindle mounted in the body, a pawl on the spindle, a handle secured to said spindle at the side of the body and operable to turn the spindle to cause the pawl to engage and unseat the valve, said body having a vent opening through a side wall thereof entering the spout at the outlet side of the valve seat, a plunger carried by the handle at the side of the faucet body, a pad carried at the inner end of said plunger, a spring constantly acting on the plunger and keeping the pad against the side of the faucet body, and said plunger and pad movable with the handle to have the pad cover the vent when the handle is moved to open the valve and to expose the vent when the handle is moved to close the valve.

9. In a faucet of the character described, a body, an inlet passage to said body for direct connection with a source of liquid supply, a single valve in the faucet controlling the passage of liquid therethrough, said body having a downwardly directed discharge spout leading from the outlet side of the valve independently thereof, there being a vent opening leading to the upper portion of said spout to permit entrance of air to allow the liquid in the spout to flow therefrom, operating means movable from a normal position to open the valve, and means separate from the valve operable by said movement to close the vent and operable to open the vent by movement of said operating means to its normal position.

GEORGE J. BELKNAP.